United States Patent
Maxie

[11] 3,782,606
[45] Jan. 1, 1974

[54] ANT POISON DISTRIBUTING APPARATUS

[76] Inventor: Lee Maxie, R.F.D. Box 200, Rayville, La. 71269

[22] Filed: Oct. 27, 1972

[21] Appl. No.: 301,312

[52] U.S. Cl. .............................. 222/244, 222/561
[51] Int. Cl. ........................................... G01f 11/14
[58] Field of Search ................. 222/177, 176, 559, 222/561, 243, 244, 245, 545; 111/36, 38, 46

[56] References Cited
UNITED STATES PATENTS

| | | | |
|---|---|---|---|
| 504,848 | 9/1893 | Palmer | 222/243 X |
| 1,330,365 | 2/1920 | Alexander | 222/545 |
| 395,153 | 12/1888 | Leamon | 222/177 |

*Primary Examiner*—Stanley H. Tollberg
*Assistant Examiner*—James M. Slattery
*Attorney*—Hyman Berman et al.

[57] ABSTRACT

An ant poison distributer adapted to be mounted on a grass clipping machine over the rotating blade of the machine so as to drop ant poison granules onto the blade for distribution. The distributor has a hopper with an agitator therein and a series of apertured plates defining a metering passage, with the discharge aperture of the lowermost plate offset relative to the registering apertures of the other plates. A reciprocating push bar moves the granules forwardly in the metering passage toward the offset aperture in the lowermost plate while closing off the supply, allowing the granules to drop through onto the rotating clipper blade. One of the metering plates has apertures of different sizes and this plate can be adjusted to move a selected aperture into registry with the other apertures so as to provide a desired discharge volume of granules.

6 Claims, 8 Drawing Figures

PATENTED JAN 1 1974 3,782,606

ANT POISON DISTRIBUTING APPARATUS

This invention relates to insecticide dispensing and distributing devices, and more particularly to a device for dispensing and spreading fire ant bait or poison of the granule type.

A main object of the invention is to provide a novel and improved device for dispensing and distributing granular ant bait or poison, the device being adapted to be mounted on a rotary-type pasture clipper or mower, being relatively simple in construction, being reliable in operation, and providing efficient distribution of the granular material without damage to the granules.

A further object of the invention is to provide an improved ant poison distributor adapted to be mounted on a conventional grass clipping machine over the rotating blade of the machine so as to drop ant poison granules onto the blade for distribution, the device being inexpensive to fabricate, being rugged in construction, being adjustable to provide a desired discharge volume of granules, and providing smooth and economical distribution of the poison granules.

Further objects and advantages of the invention will become apparent from the following description and claims, and from the accompanying drawings, wherein:

Figure 1:
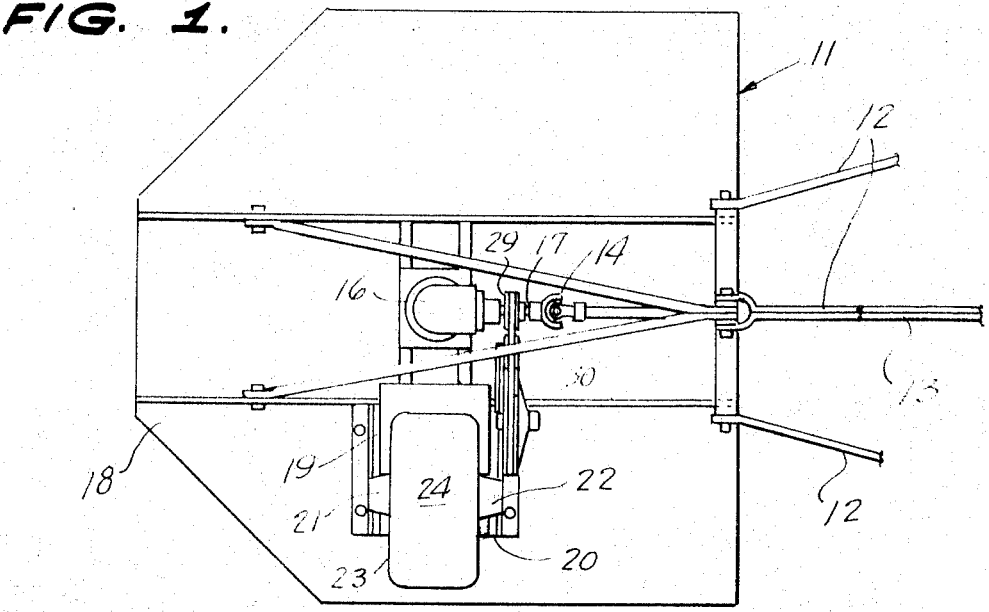
FIG. 1 is a top plan view of a grass clipping machine having an improved ant poison distributor according to the present invention mounted thereon.
Figure 2:
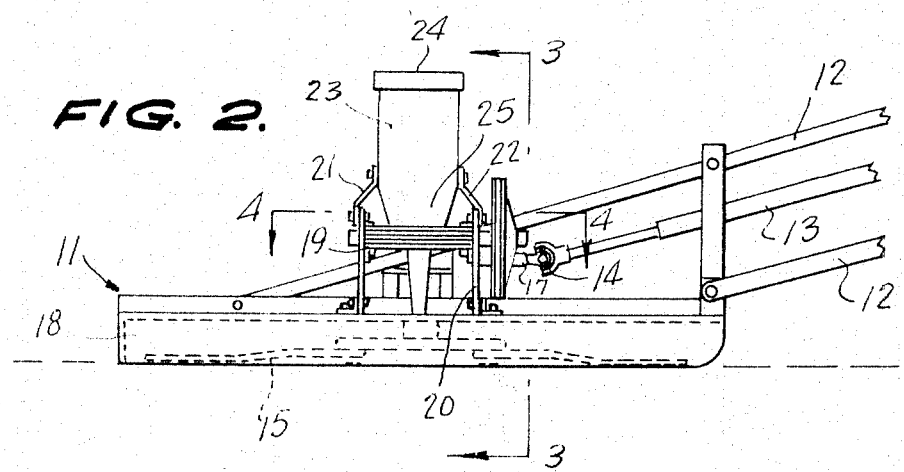
FIG. 2 is a side elevational view of the assembly shown in FIG. 1.
Figure 3:
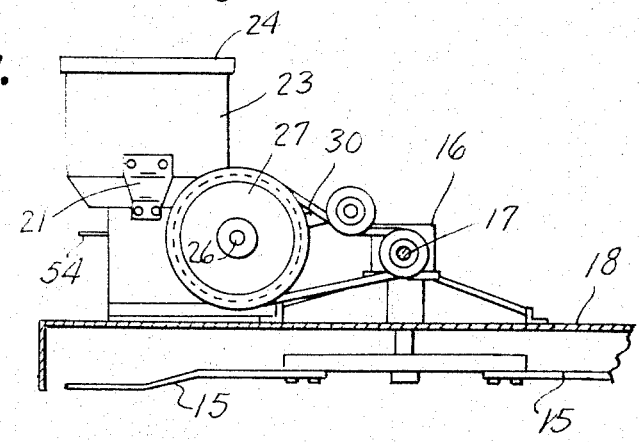
FIG. 3 is a fragmentary transverse vertical cross-sectional view taken substantially on line 3—3 of FIG. 2.

Referring to the drawings, 11 generally designates a conventional pasture clipper mower of the rotary blade type adapted to be attached to a conventional tractor, for example, by hitch bars 12 and adapted to be driven from the power take-off shaft of the tractor, for example, by means of a telescopic drive shaft 13 connected to the grass clipper mechanism by means of a universal joint 14. The rotary blade 15 of the clipper 11 is thus driven by the shaft 13 through the universal joint 14 and through a gear box 16 having the input shaft 17. The clipper assembly 11 is provided with the housing 18 which overlies and covers the rotary blades 15.

Mounted on the top wall of the housing 18 and spaced laterally from the gear box 16 are a pair of spaced parallel upstanding transversely extending bracket plates 19 and 20, and rigidly secured to the top margins of said bracket plates by means of respective rigid strap members 21 and 22 is an upstanding hopper 23 provided with a removable top cover 24. Hopper 23 is provided with a downwardly convergent bottom discharge portion 25. Hopper 23 may be of any suitable shape, for example, may be of rectangular cross-sectional shape as illustrated in the drawings.

Figure 4:
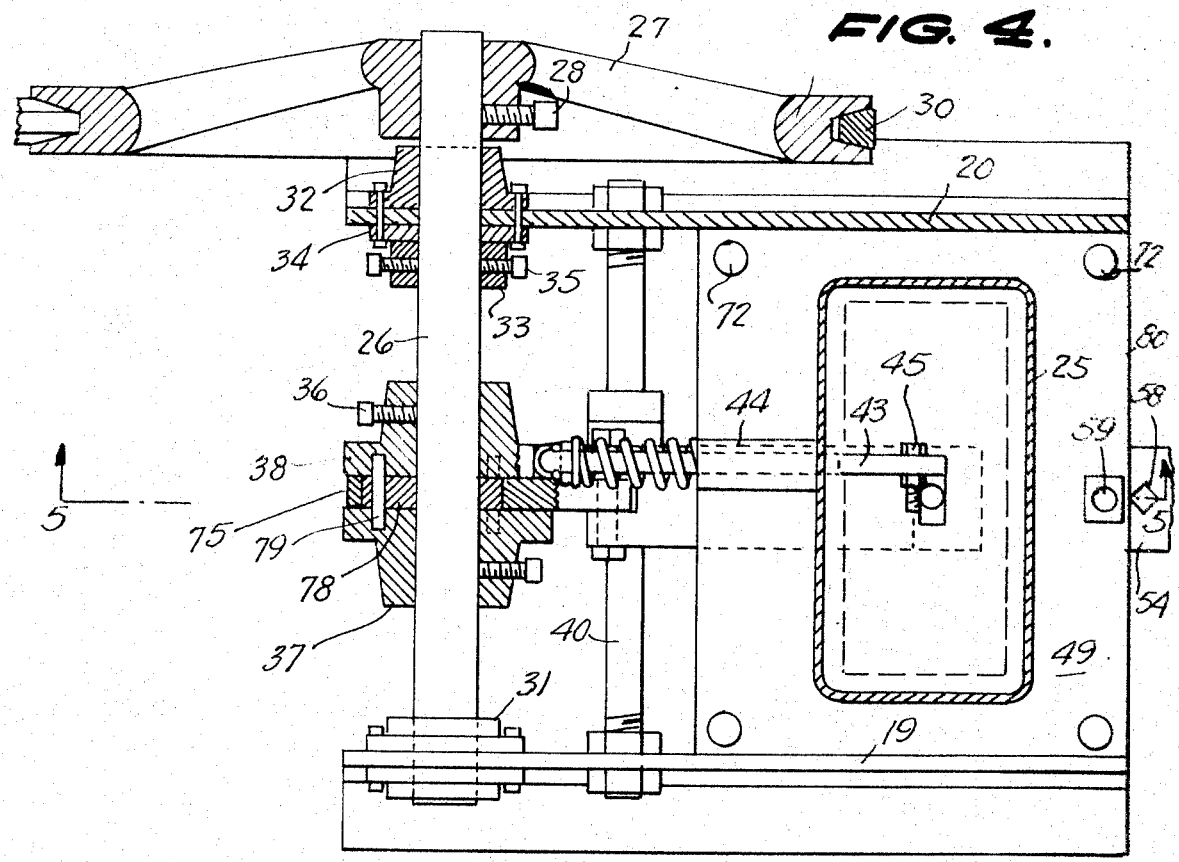
FIG. 4 is an enlarged horizontal cross-sectional view taken substantially on line 4—4 of FIG. 2.

Journalled in the upper inner corner portions of the upstanding bracket plates 19 and 20 is a longitudinally extending shaft 26 provided with a relatively large pulley 27 secured on its forward end portion, as by a set screw 28 threadedly engaged through the hub portion of the pulley and clampingly engaging shaft 26, as shown in FIG. 4. Pulley 27 is aligned with a smaller pulley 29 secured on the mower input shaft element 17, and the large pulley 27 is drivingly coupled to the smaller pulley 29 by a conventional V-belt 30.

As shown in FIG. 4, the rear end portion of shaft 26 is journalled in a suitable bearing assembly 31 provided at the upper inner corner portion of the bracket plate 19 and the forward portion of the shaft 26 is journalled in a bearing bushing 32 provided at the upper inner corner portion of the bracket plate 20. A stop collar 33 is secured on shaft 26 adjacent to an inner bearing washer 34 at the inside surface of plate member 20, as by set screws 35, to limit endwise movement of shaft 26.

Figure 5:
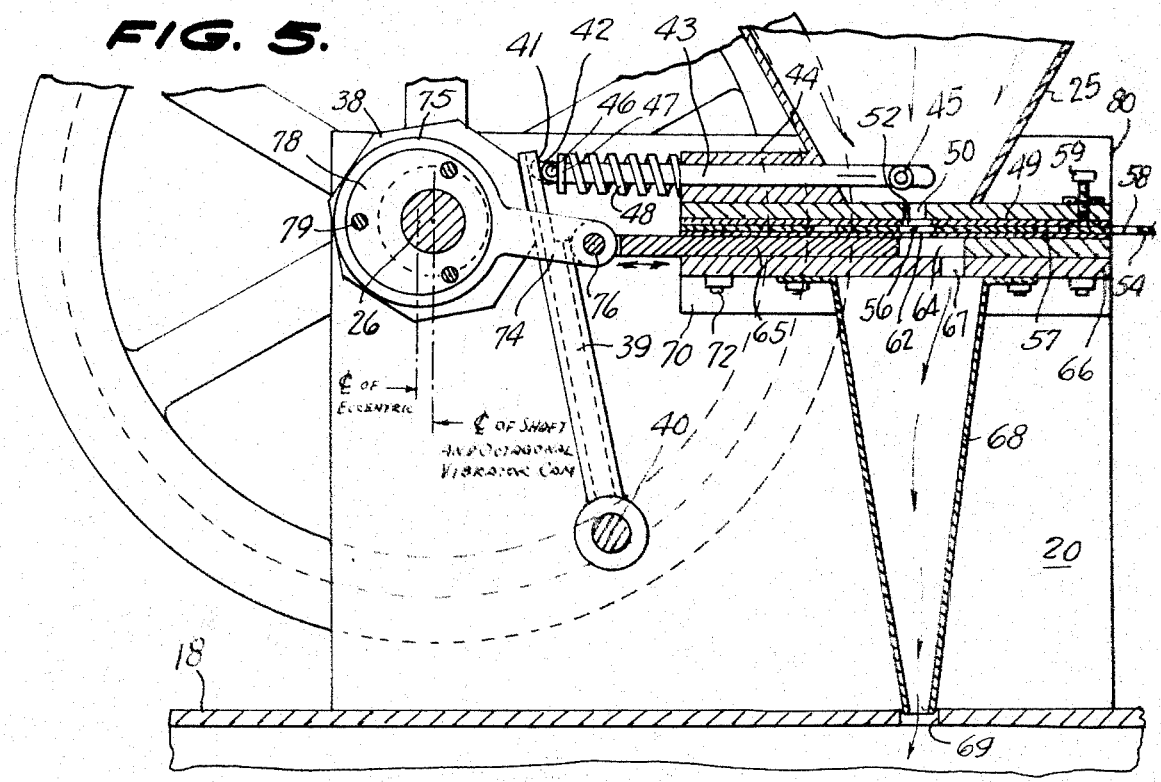
FIG. 5 is a fragmentary cross-sectional view taken substantially on line 5—5 of FIG. 4.

Secured on the intermediate portion of shaft 26, as by set screws 36, is a multi-segment hub member 37, one of whose segments is integrally formed with a polygonal cam 38 which, for example, may be octagonally shaped as shown in FIG. 5. Engaging against cam 38 is an upstanding arm 39 which is pivotally mounted on a longitudinally extending supporting shaft 40 rigidly secured between the lower portions of the bracket plates 19 and 20. Arm 39 is of tubular shape and is cut away at its top portion, as shown at 41, to define a semi-cylindrical seat which receives the rounded left-end portion 42 of a horizontal agitator rod 43 slidably mounted in a horizontal sleeve 44 formed integrally with the lower end of the discharge portion 25 of hopper 23, as shown in FIG. 5. Agitator rod 43 extends into hopper portion 25 and has a transversely extending bolt 45 secured thereon to act as a granule-agitating element. A transverse abutment pin 46 is secured in the left-end portion of rod 43, as viewed in FIG. 5, adjacent the rounded end 42 thereof against which is engaged a washer 47 which acts as an abutment for the left-end portion of a coil spring 48 surrounding rod 43 and bearing between washer 47 and the outer end portion of sleeve 44, biasing rod 43 leftwardly, as viewed in FIG. 5, namely, biasing the rounded end portion 42 thereof toward the seat defined by the cut-away portion 41 of arm 39.

As will be apparent from FIG. 5, rotation of the shaft 26 causes the cam 38 to oscillate the arm 39 and to thereby reciprocate the agitator rod 43, causing the agitating element 45 thereof to agitate the granular material in the lower portion 25 of hopper 23 and to maintain the material free for downward flow.

Figure 6:
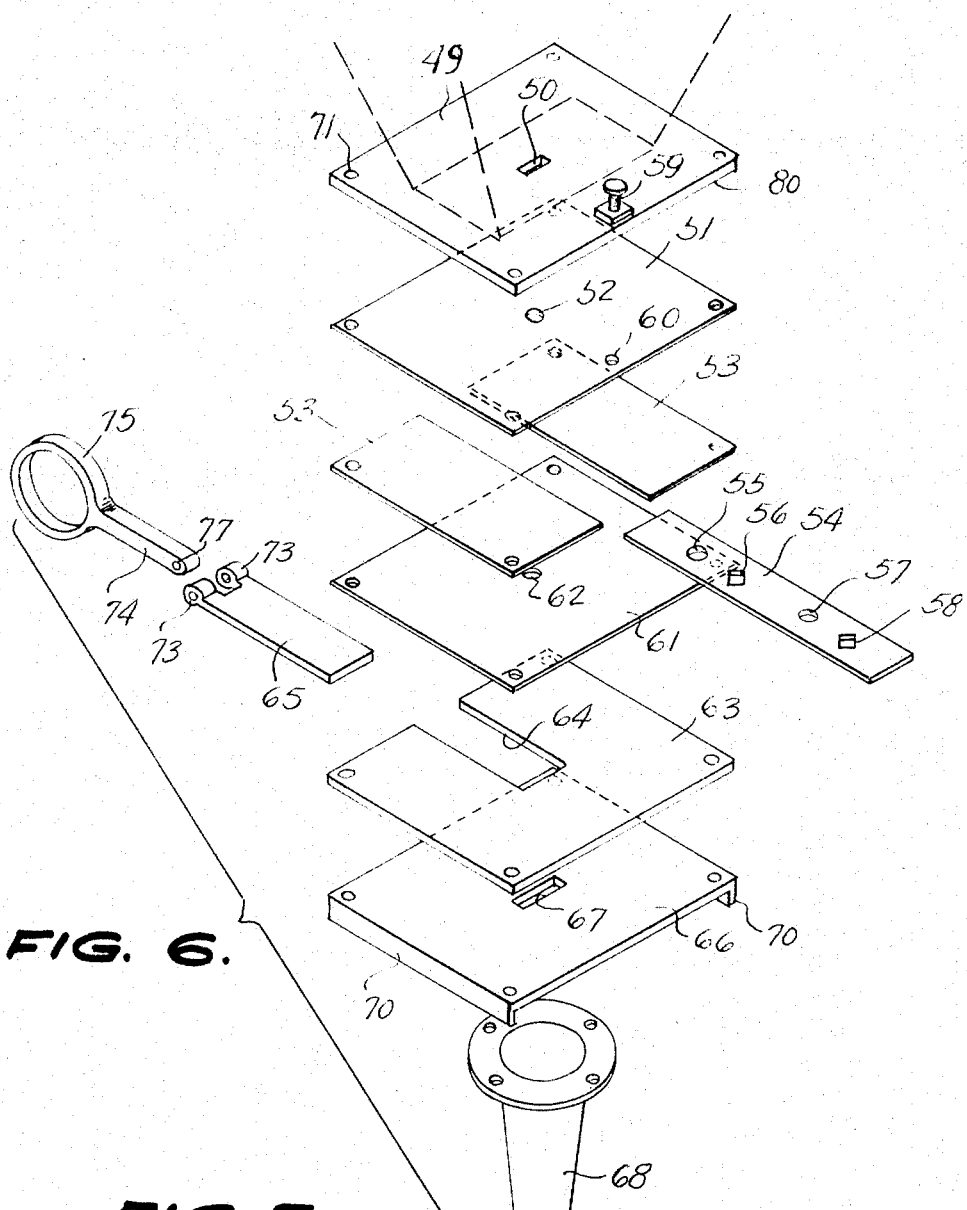
FIG. 6 is an exploded perspective view showing the components of the granule metering assembly employed in the ant poison distributing device of FIGS. 1 through 5.

Secured between the bracket plates 19 and 20 immediately below the bottom of hopper discharge portion 25 is a series of horizontal rectangular plates superimposed on one another, said plates being shown in detail in FIG. 6. The uppermost plate shown at 49 is provided at its central portion with a rectangular aperture 50 of suitable size to allow the granules to flow therethrough, for example, approximately one inch wide and one and one-quarter inch long. Immediately subjacent plate 49 is another rectangular plate 51 provided with a central circular aperture 52 registering with aperture 50, the aperture 52 being likewise of suitable size, for example, one-half inch in diameter. Secured immediately subjacent plate 51 are two coplanar spaced parallel rectangular plates 53, 53 between which is engaged an adjustable metering plate 54 provided with a circular aperture 55 and a diamond-shape aperture 56, either of which can be moved into registry with the aperture 52 by adjusting the position of the plate 54. The aperture 55 and 56 have different areas so as to provide two different rates of flow granules therethrough. Corresponding apertures 57 and 58 are provided in the elongated adjustable plate member 54 at the outer end portion thereof to serve as markers to indicate which of the apertures 55 and 56 is in operating position. A clamping screw 59 is provided on the top plate 49, said screw 59 registering with an aperture 60 provided in the subjacent plate 51 so that the screw 59 may be employed to apply clamping force on the tongue member 54 so as to lock said tongue member in an adjusted position.

Immediately subjacent the plates 53, 53 is another horizontal rectangular plate 61 having a central circular aperture 62 registering with the aperture 52 of plate 51. Aperture 62 is of the same size as aperture 52, namely, may be approximately one-half inch in diameter.

Figure 7:
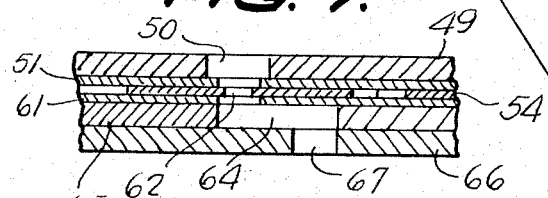
FIG. 7 is an enlarged fragmentary vertical cross-sectional view taken through the metering plate assembly of the ant poison distributing device with the push rod in retracted position allowing a metered quantity of ant poison granules to descend into the metering chamber of the assembly.

Secured immediately subjacent the plate 61 is another horizontal rectangular plate 63 formed with a rectangular notch 64 adapted to slidably receive a horizontally reciprocable pusher bar 65 which is slidably supported on the next subjacent plate, shown at 66. As shown in FIG. 7, the inner end portion of the notch 64 extends beyond the aperture 62 to the right, as viewed in FIG. 7, and terminates over a rectangular aperture 67 provided in the lowermost plate 66 and which is therefore offset from the aperture 50 in the top plate 49 by a distance such as to provide a metering chamber in the inner end portion of notch 64, as will be presently described.

Secured to the lowermost plate 66 in registry with the aperture 67 is a downwardly convergent, generally conical discharge spout member 68 whose lower end extends into an aperture 69 provided in the top wall of the housing 18 and located above the path of movement of the rotary blades 15, so that material dropping through the spout member 68 will fall on the blades 15 and will be spread by said blades.

The offset bottom aperture 67 of plate 66 may be of suitable size, for example, approximately one-quarter inch wide and one and three-quarter inches long, which is of a size suitable for feeding out the granules which have been pushed to it by the pusher bar 65, as will be presently described.

The plate members 49, 51, 53, 53, 61, 63 and 66 may be secured between the upstanding bracket plates 19 and 20 in any suitable manner. For example, the bottom plate 66 may be provided with attachment flanges 70, 70 adapted to be secured to the bracket plates 19 and 20, and the various plates may be provided at their corners with registering apertures 71 through which bolts 72 may be engaged to secure the plates in superimposed relationship.

Figure 8:
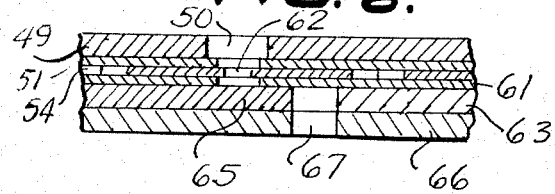
FIG. 8 is a cross-sectional view similar to FIG. 7 but showing the push rod in extended position wherein the metered quantity of granules is pushed to the discharge aperture of the assembly so as to cause the granules to drop through the final discharge opening.

The pusher bar 65 is provided at its outer end with aligned hinge sleeves 73, 73 receiving therebetween the apertured end of the arm 74 of an eccentric ring 75, a wrist pin 76 being engaged through the sleeves 73, 73 and the aperture 77 of arm 74. Ring 75 surrounds and is driven by an eccentric disc 78 secured between the opposite segments of hub 37, as by transverse drive pins 79, providing a driving connection between shaft 26 and eccentric disc 78. Thus, rotation of shaft 26 causes the pusher bar 65 to reciprocate between the position thereof shown in FIG. 7, which is the intake position for the metering space above-mentioned, and the discharge position shown in FIG. 8, wherein the granules deposited in the metering space are pushed toward the discharge aperture 67, while closing off the delivery apertures.

In operation, the granules flowing from the bottom end of the lower discharge hopper portion 25 pass through aperture 50, aperture 52, a selected one of the apertures 55 or 56, and the aperture 62 into the metering space at the inner end portion of notch 64 when the pusher bar 65 is in its retracted position, shown in FIG. 7. Thus, a definite amount of granules are admitted into the metering space, and this definite amount of material is pushed rightwardly, as viewed in FIG. 7, toward the exit aperture 67 and is discharged therethrough, while the admission apertures are closed off. Thus, the discharge of the granules into the spout 68 takes place at the end of the extension stroke of the push bar 65. Thereafter, the bar 65 is retracted to return to the position thereof shown in FIG. 7, allowing another metered quantity of granules to descend into the metering space, to thereafter repeat the foregoing process. With each stroke of the push bar 65, a metered quantity of granules is pushed through the aperture 67 into the spout member 68 and is guided thereby downwardly through the aperture 69 onto the rotating blades 15, whereby the granules are spread by said blades and are uniformly distributed thereby over the ground as the grass clipping machine 11 is moved by its associated tractor over the ground.

As above-mentioned, the adjustable flow-regulating metering bar 54 is provided with the setting-indicating apertures 57 and 58 to indicate which of the flow passage apertures 55 or 56 is located in registry with the apertures 52 and 62 of plates 51 and 61. Thus, the apertures 57 and 58 are so located that when one of these apertures is just visible beyond the side edge 80 of the top plate 49, the correspondingly shaped aperture 55 or 56 will be in proper registry with the apertures 52 and 62 upwardly and downwardly adjacent thereto. For example, FIGS. 4 and 5 show the diamond-shaped aperture 58 as being just visible beyond the side edge 80, which automatically places the diamond-shaped aperture 56 in registry with the stationary apertures 52 and 62. Since the longitudinal spacing between the apertures 57 and 58 is the same as between the apertures 55 and 56, when the circular aperture 57 is just visible beyond edge 80, the circular aperture 55 will be placed in registry with apertures 52 and 62, providing a smaller flow rate of granules. As above-mentioned, the adjustable tongue-like plate member 54 is clamped in adjusted position by means of the clamping screw 59.

From the above description, it will be apparent that the granular material from hopper 23 is dispensed at a regulated rate and that the granules pass through the feed apertures into the metering space at the inner end of the notch 50 and are thereafter pushed sufficiently to drop through the exit aperture 67 into the spout 68 in a manner which avoids crushing or grinding the granules.

It will be further apparent that the ant poison-dispensing and spreading device above described can be used simultaneously with the regular clipping action performed by the main grass clipping machine 11, thereby providing the user with a substantial time and money-saving advantage, since it allows the operator to spread the ant bait at the same time as he performs the regular grass clipping operation.

While a specific embodiment of an improved ant poison distributing apparatus has been disclosed in the foregoing description, it will be understood that various modifications within the spirit of the invention may occur in those skilled in the art. Therefore, it is intended that no limitations be placed on the invention except as defined by the scope of the appended claims.

What is claimed is:

1. An ant poison distributing apparatus comprising a support, a hopper mounted on said support and having a downwardly extending bottom outlet portion, a rotary driving shaft mounted adjacent said hopper, means on said support mounted below said outlet portion and defining a horizontally extending metering chamber having a top inlet aperture communicating with said hopper outlet portion and having a bottom outlet aperture offset a substantial horizontal distance from said inlet aperture, a push bar slidably mounted in said metering chamber in alignment with said inlet and outlet apertures, crank means drivingly connecting said rotary driving shaft to said push bar in a manner to reciprocate said push bar so that the inner end of the push bar travels substantially between said inlet and outlet apertures, a horizontal reciprocating agitator bar slidably mounted in the wall of said hopper outlet portion, and a means drivingly coupling said rotary driving shaft to said agitator bar, said last-named driving means including a non-circular cam on the rotary driving shaft, a lever pivoted to said support and engaging the periphery of said cam, said lever having a channeled outwardly facing seat at its free end, the outer end of said agitator bar being receivable in said seat, and spring means biasing the agitator bar toward engagement in said seat.

2. An ant poison distributing apparatus comprising a support, a hopper mounted on said support and having a downwardly extending bottom outlet portion, a rotary driving shaft mounted adjacent said hopper, means on said support mounted below said outlet portion and defining a horizontally extending metering chamber having a top inlet aperture communicating with said hopper outlet portion and having a bottom outlet aperture offset a substantial horizontal distance from said inlet aperture, a push bar slidably mounted in said metering chamber in alignment with said inlet and outlet apertures, crank means drivingly connecting said rotary driving shaft to said push bar in a manner to reciprocate said push bar so that the inner end of the push bar travels substantially between said inlet and outlet apertures, a flow rate adjusting bar slidably mounted horizontally in said meter chamber-defining means beneath said inlet aperture and having at least two flow apertures of different sizes selectively registrable with said inlet aperture, and means to clamp said rate adjusting bar in a selected position relative to said inlet aperture, said metering chamber-defining means including a top horizontal first flow plate containing the inlet aperture, a second horizontal flow plate subjacent the first plate and having an aperture registering with said inlet aperture, a pair of horizontal coplanar spacer plates subjacent said second flow plate between which said flow rate adjusting bar is slidably received, a third horizontal flow plate subjacent said spacer plates and having an aperture in registry with said inlet aperture, a fourth horizontal flow plate having a notch slidably receiving said push bar, the inner end portion of said notch communicating with the flow aperture of said fourth flow plate and extending horizontally said substantial distance beyond said last-named flow aperture, a fifth horizontal flow plate containing said outlet aperture and communicating with the extreme inner end of said notch, and means rigidly securing said horizontal plates to said support.

3. The distributing apparatus of claim 2, and a downwardly tapering depending discharge conduit secured to said metering chamber below and in communication with said bottom outlet aperture.

4. The distributing apparatus of claim 2, and wherein said clamping means comprises a clamping screw threadedly engaged with said top horizontal first plate and being clampingly engagable with said flow rate adjusting bar.

5. The distributing apparatus of claim 4, and wherein said flow rate adjustable bar is provided with externally exposed indicating means to indicate the position of adjustment of the flow rate adjusting bar.

6. The distributing apparatus of claim 5, and wherein the flow apertures of the flow rate adjusting bar are of different shapes and wherein said indicating means comprises indicating additional apertures formed in the adjusting bar and respectively corresponding in shape to the flow apertures of the adjusting bar.

* * * * *